Oct. 23, 1956 — A. K. PETERSON — 2,767,767
METHOD AND APPARATUS FOR STRAIGHTENING INTEGRALLY REINFORCED METAL EXTRUSIONS
Filed June 6, 1952 — 2 Sheets-Sheet 1
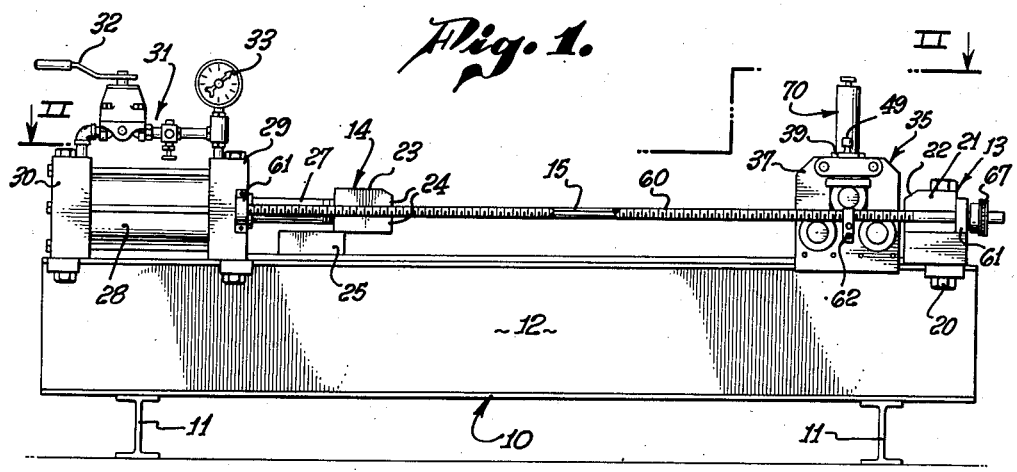
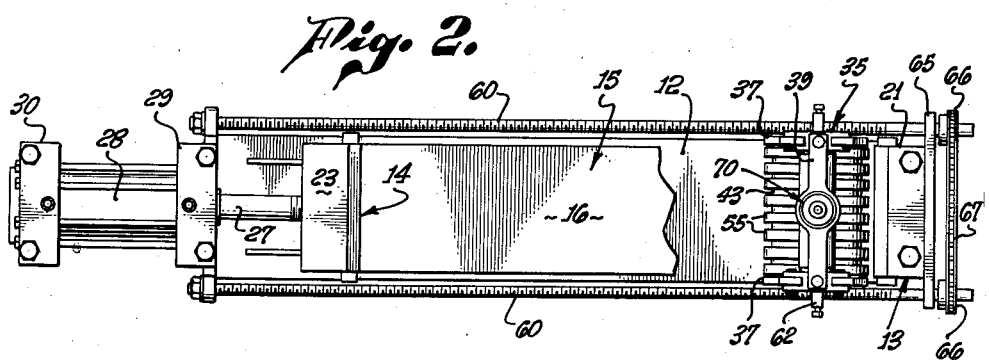
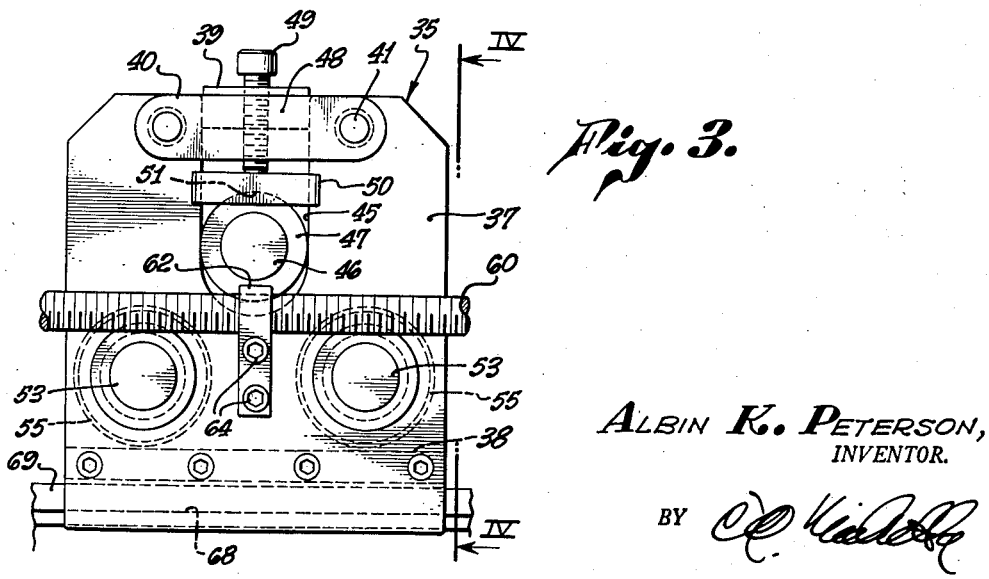
ALBIN K. PETERSON, INVENTOR.
BY 
ATTORNEY.

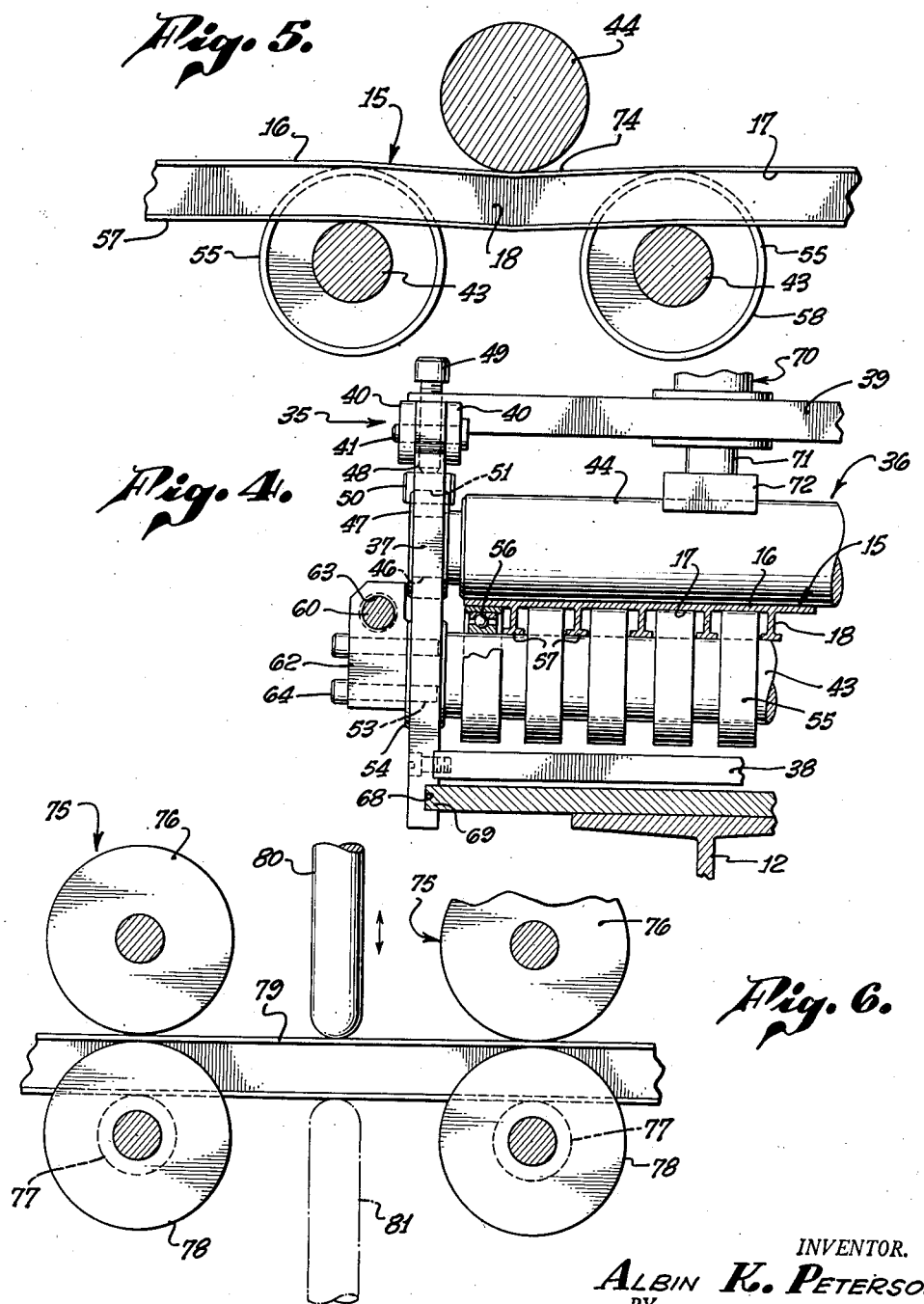

United States Patent Office 2,767,767
Patented Oct. 23, 1956

2,767,767

METHOD AND APPARATUS FOR STRAIGHTENING INTEGRALLY REINFORCED METAL EXTRUSIONS

Albin K. Peterson, Torrance, Calif., assignor to Longren Aircraft Company, Torrance, Calif., a partnership Application June 6, 1952, Serial No. 292,065

14 Claims. (Cl. 153—90)

This invention relates to an apparatus and method for straightening structural metal members and more particularly to an apparatus for flattening structural metal panels or sheets extruded in curved form and having integral reinforcing means such as T-shaped ribs and the like, said panels being adapted for use as skin sections for aircraft, formed bodies, and the like.

An exemplary structural reinforced extruded metal member which the apparatus of this invention is designed to flatten or straighten may be an integrally reinforced skin section as used in fabricating a wing of an airplane. The apparatus of this invention will be described with respect to such an extruded metal member or skin section for purposes of illustration.

In the construction of modern aircraft, an important problem is that of increasing strength of skin sections of a wing while attempting to decrease weight of the metal used and cost of labor for fabricating the wing. Heretofore, aircraft skin sections were fabricated by utilizing a flat sheet or panel of metal and then riveting thereto a plurality of selectively spaced reinforcing ribs of selected shape, such as a T-shape. The riveting of the ribs to the sheet of metal was time-consuming and relatively difficult because the sheet and the ribs were required to be maintained accurately in position during the fabrication. The multitude of rivets required not only increased the weight of the reinforced skin section but also presented an outer surface which was not aerodynamically correct because of the multitude of slight depressions or dishing of the metal caused by the riveting process.

One solution to this problem has been to provide a method of extruding metal skin sections with integral reinforcing ribs thereon in the form of a hollow cylinder with the ribs extending radially outwardly thereof and the inner surface of the cylinder being relatively smooth and providing ultimately an aerodynamic surface. This extruded hollow cylinder is then cut into selected lengths. Each length may then be cut longitudinally for unrolling transversely into a partially flattened and straightened form by suitable means. In other words, the general cylindrical form is extended into generally flat form, is still irregular, and does not present a desired smooth, flat top aerodynamic surface. Such partially flattened or straightened panel sections may exhibit a tendency to partially return to rolled form and are not suitable for application to a wing structure in preliminary flattened form.

The apparatus of this invention is designed to straighten such a partially flattened extruded integrally reinforced skin metal section so that the external surface of the skin section will be virtually flat and smooth and so that undesirable stresses will not be present in the integral reinforcing ribs or the sheet forming the flat surface.

An object of this invention is to design and provide an apparatus capable of straightening an extruded structural metal panel section integrally ribbed on one surface.

Another object of this invention is to design and provide an apparatus for straightening a ribbed extruded metal structural panel section to provide a flat continuous external surface disposed in parallel relationship with flat faces on reinforcing ribs lying in parallel planes spaced from the plane of the flat surface.

Another object of this invention is to design and provide an apparatus wherein an extruded partially flattened metal structural section is placed under selected tension and is then stressed in localized areas to a point beyond the yield point of the metal so as to permanently form the metal section into a selected form.

A further object of this invention is to design and provide an apparatus capable of stressing an extruded integrally reinforced metal structural section in selected consecutive localized areas beyond the yield point for permanently forming the metal section with little distortion thereof.

A still further object of this invention is to design and provide an apparatus for flattening extruded metal sections wherein pressure applying idle roll means are provided for progressively stressing the metal section beyond the yield point.

This invention contemplates an apparatus as described above wherein vibratable means are utilized in association with the roll means for stressing the metal sections slightly beyond the yield point in localized areas.

This invention contemplates an apparatus as described above wherein a metal section is stretched between fixed and adjustable chuck holding means and wherein a carriage having pressure applying idle roll means is progressively movable along the metal section, at least one of the roll means being provided with a plurality of radially spaced surfaces adapted to contact correspondingly spaced surfaces on the reinforcing ribs and adjacent intermediate panel surfaces of the metal section.

Generally speaking, this invention contemplates an apparatus wherein a partially straightened extruded metal structural skin section is stretched to a point just below the yield point of the metal between a fixed chuck holding means and an adjustable chuck holding means. A carriage, provided with a top idle roller of uniform diameter having a smooth surface and a pair of bottom idle rollers each having a plurality of surfaces adapted to cooperate with the ribbed configuration of the metal section is progressively moved along the length of the stretched metal section. The top roller is adjustable so as to apply pressure to the metal section along a transverse line of contact between the spaced bottom rollers. Associated with the top pressure applying roller is a vibratable means which is adapted to produce vibrations at selected frequencies which are transmitted through the pressure applying top roller to the metal section being worked so as to stress the metal lying between the top and bottom rollers into a point slightly beyond the yield point of the metal to permanently straighten the metal section. Each bottom roller is provided with spaced, freely rotatable cylindrical elements adapted to project between the reinforcing ribs for contact with the bottom surface of the sheet or panel portion of the metal section while the surface of each bottom roller is adapted to contact the lowermost flat surface portion of each reinforcing rib.

The method of this invention contemplates stretching an integrally reinforced ribbed panel section in a planar zone to a point below the yield point of the metal and then progressively deflecting the panel section in localized zones so as to carry the metal in said zones beyond the yield point. The progressive deflection may include imparting vibrations of selected frequencies to the metal in the deflected localized zone. After the initial stretch and progressive deflection of the panel section, the panel section may be re-stretched if desired.

Other objects and advantages of this invention will be readily apparent from a following description of the drawings in which an exemplary illustration of an apparatus embodying this invention is shown.

In the drawings:

Fig. 1 is a side view of an apparatus embodying this invention.

Fig. 2 is a top view of the apparatus shown in Fig. 1.

Fig. 3 is a side view of a carriage and roller means employed with the apparatus shown with Figs. 1 and 2.

Fig. 4 is a fragmentary view of the carriage and roller means taken from the plane indicated by plane IV—IV of Fig. 3.

Fig. 5 is a fragmentary enlarged longitudinal sectional view showing the relationship of the roll means and extruded stretched panel member being straightened.

Fig. 6 is a fragmentary enlarged view of a diagrammatically illustrated modification of this invention.

Referring to the drawings, an apparatus embodying this invention may comprise a suitable base generally indicated at 10 including a pair of spaced transverse base members 11 and a longitudinally extending base member 12 supported adjacent opposite ends on said transverse base members 11. The base members 11 and 12 may be of any suitable structural section.

Carried by the base 10 are longitudinally spaced fixed chuck holding means 13 and movably adjustable chuck holding means 14. Between the chuck holding means 13 and 14 may be stretched an extruded metal reinforced sheet or panel member 15. The panel member 15 is integrally formed, and in the exemplary illustration, is provided with a top sheet or panel having a virtually flat surface 16 and bottom faces 17 lying between a plurality of longitudinally extending, spaced flanged reinforcing ribs 18 which lie generally in planes perpendicular to the flat surface 16.

The fixed chuck holding means 13 may be secured to the base by suitable securing bolts 20. Separable transversely extending jaw elements 21 of chuck holding means 13 are adapted to securely grasp, as at 22, an end margin of extruded panel member 15.

The adjustably movable chuck holding means 14 may comprise a chuck head 23 having separable transverse jaw elements 24 adapted to securely grasp the opposite end margin of member 15. The chuck holding means 14 may be slidably supported on a pair of spaced, upstanding plates 25 having top edges lying in a selected horizontal plane and adapted to support the chuck holding means 14 so that the panel member 15 will lie in parallel relation to the base.

The chuck holding means 14 is carried at the end of a piston rod 27 which is associated with a power cylinder 28 and carries within said cylinder a piston head (not shown). The cylinder 28 is suitably mounted in end retaining blocks 29 and 30 and may be hydraulically operated. The cylinder 28 is operably connected to a suitable valve and piping arrangement, generally indicated at 31. A valve control means 32 is provided for reciprocally moving the chuck holding means 14 to adjust tension on the panel member 15 being stretched. A suitable indicating means 33 may be provided for visually showing the tension applied to the stretched member 15.

Means for progressively rolling and vibrating the stretched panel member 15 is provided by a carriage 35 driven along said base and carrying transversely extending roll means, generally indicated at 36. The carriage 35 may comprise a pair of spaced polygonal end plates 37 of relatively thick section. Lower portions of plates 37 may be interconnected by a transversely extending horizontal plate-like spacer member secured as by screws 38, said member serving to maintain the lower portions of the end plates 37 in selected spaced relationship and may be disposed slightly above the top surface of bed 10. The spaced end plates 37 may also be interconnected at the top thereof by a transversely extending cross member 39, said member 39 being secured at each end to top portions of each plate 37 by longitudinally extending inner and outer straps 40. The straps 40 may be secured to adjacent top portions of plate 37 by suitable bolt assemblies 41.

The roll means 36 includes a pair of bottom, horizontally spaced transverse idle rolls 43 and a top transverse idle roll 44 carried above and between the bottom rolls 43. The top roll 44 is vertically adjustably mounted on carriage 35 and is adapted to contact under pressure the top surface of the stretched member 15.

Means for adjustably supporting the top roll 44 and for applying pressure thereto may include a vertically arranged open ended slot 45 formed in each end plate 37. Each slot 45 accommodates therewithin a suitable anti-friction bearing means 47 carrying a reduced end portion 46 of top roll 44 for freely, rotatably mounting top roll 44 in said slot. The open top end of slot 45 is closed by straps 40 which extend thereacross and which serve to support with a horizontal member 48 a pressure applying adjustable screw or jack 49. The screw 49 is suitably connected at its lower end to a bearing pressure distributing member or shoe 50 which is adapted to partially receive, as at 51, the outer top portion of the outer race of anti-friction bearing 47 so as to virtually uniformly distribute pressure to the bearing and to the reduced end portions of the top roll. It will thus be apparent that the top roll may be readily adjusted for selected pressures to be applied to the top surface of stretched member 15.

The bottom spaced idle rolls 43 are each provided with reduced end portions 53 which are received within anti-friction bearing means 54 accommodated in suitable aligned ports formed in end plates 37. Each bottom roll 43 may be formed of uniform diameter slightly smaller than the diameter of top roll 44. Each bottom roll 43 is adapted to removably and slidably carry, in spaced relation, a plurality of cylindrical elements 55 of selected outer diameter and of selected relatively short axial length which are adapted to closely project between depending reinforcing ribs 18 of the stretched member 15 for contact against the bottom faces 17 of the top panel portion of member 15. Each cylindrical element 55 may be carried by an anti-friction bearing means 56 slidably along the bottom roll 43 to conveniently position element 55. The bearing means 56 are freely rotatable on the bottom roll.

The radius of each cylindrical element 55 is correlated with the radius of bottom roll 43 so that the differential in radius therebetween is substantially equal to the distance between the bottom face 17 of member 15 and the bottom face 57 of a depending reinforcing rib 18. By this arrangement, when a panel member 15 is placed over the bottom rolls 43 and cylindrical elements 55, the bottom faces 57 of ribs 18 will contact the adjacent outer cylindrical surface portion of bottom roll 43 and the intermediate bottom faces 17 of the panel or sheet portion of member 15 will contact the outer cylindrical surfaces 58 of cylindrical elements 55.

Means for driving the carriage longitudinally along the bed may comprise a pair of longitudinally extending side threaded members or screws 60 on opposite sides of the bed. Each screw 60 is supported at the end adjacent to the movable chuck by suitable journal members 61 secured to the retainer blocks 29 supporting cylinder 28. Each end plate 37 of the carriage is provided with a sidewardly extending member 62 having a threaded port 63 adapted to engage a drive screw 60 in threaded relationship. The member 62 may be secured to each end plate by a pair of vertically spaced stud bolts 64. Each drive screw 60 extends beyond the fixed chuck holding means 13 and may be journaled in a transversely disposed ported member 65 carried by the fixed chuck holding means 13.

Means for rotating the pair of drive screws simultaneously and at the same rate includes a gear or sprocket 66 carried on an extension of each screw 60 beyond member 65. The gears 66 may be interconnected by a drive chain 67 for rotating each drive screw 60 simultaneously and with a uniform rate of rotation so as to positively drive carriage 35 along the length of the bed. One of the ends of drive screw 60 may be suitably connected to drive means (not shown) for supplying the necessary driving force to the screws 60.

The carriage 35 may be guided in its movement along the bed by a longitudinally extending groove 68 formed in the inner lower surface portion of each plate 37. Each groove 68 slidably receives a guide tongue 69 provided on each side of the bed for supporting the carriage on the bed.

Means for imparting vibrations of selected frequency to the top roll 44 is generally indicated at 70 and may be carried by cross member 39 at the central portion thereof. The vibrator means 70 includes a vertically reciprocally movable vibrator shaft 71 which carries at its lower end a vibrator shoe 72 adapted to bear against an upper portion of the top roll 44. The vibrator means 70 may include any suitable vibrator mechanism for producing relatively high frequency vibrations of relatively small amplitude so that transmission of the vibrations to the stretched member 15 will stress or work the underlying portion of the metal member slightly beyond the yield point of the metal.

To support an extruded structural integrally reinforced panel member 15 on the apparatus of this invention for straightening, top roll 44 may be removed from slots 45 by unfastening a bolt and nut assembly 41 on each side of the carriage to permit pivoting of cross member 39 about the opposite bolts 41 which secure the straps 49 to plates 37. The cross member 39 and vibrator means 70 may then be lifted and pivoted to one side of slot 45. The top roll 44 together with the bearing shoe 50 and anti-friction bearing means 47 may be removed from slot 45. The movable chuck 14 may be extended to an approximate half forward position and carriage 35 moved into proximity with the moveable chuck 14. The extruded panel member 15 may then be positioned over bottom rolls 43 with the reinforcing ribs projecting downwardly between the cylindrical elements 55.

The top roll 44 together with the bearings 47 and bearing shoes 50 may be re-assembled in the slots 45 and the cross member 39 and vibrator means 70 pivoted into normal operative position on the carriage 35 and secured. The pressure screws 49 may be slightly tightened to adjust the panel member 15 into virtually flat position between the rolls 43 and 44. The end margin of panel member 15 may now be grasped by the movable chuck holding means 14. The carriage is then moved to the opposite end of the bed into proximity with the fixed chuck holding means 13 and the opposite end margin of the panel member 15 may be moved into the fixed chuck holding means by further extension of the movable chuck holding means 14. The fixed chuck holding means is then actuated to grasp the adjacent end margin of the panel member 15.

In operation, the carriage 35 is moved into close proximity to the fixed chuck holding means 13. The pressure applying screws 49 are then adjusted so as to slightly depress the panel member 15 between the bottom rollers 43 as indicated in Fig. 5 at 74. The movable chuck holding means 14 may then be retracted by manipulation of the valve control means 32 until the indicator means 33 shows that the panel member 15 is stretched to a point slightly below the yield point of the metal of the panel member 15. The vibrator means 70 may then be actuated and the carriage 35 may be slowly driven from a position adjacent to the fixed chuck holding means 13 to the movable chuck holding means 14.

As the carriage and roll means progress along the stretched metal panel member 15 the vibrator means produces impact forces of selected magnitude on the panel member 15. These impact forces together with the slight bending or flexing of member 15 between the spaced bottom rolls 43 further stresses or works the metal, in the localized areas acted upon by the top roller 44, slightly past the yield point and thereby straightens the panel member 15. The tension of the stretched metal member is closely regulated so that it may remain substantially uniform during the straightening operation. Working of the stretched metal member by means including a pair of bottom rollers having spaced radial faces adapted to contact spaced faces on the metal member, such as faces 17 and 57, provides a means for effectively working substantially all of the metal in the metal member.

In Fig. 6 is illustrated a slightly different modification of this invention wherein two sets of top and bottom rollers are spaced longitudinally for passing and straightening a metal panel member therebetween and a vibrator means is actuable between the spaced sets of rolls for working the metal of the metal member located between the sets of rolls past the yield point.

Each set of rolls generally indicated at 75 comprises a top idle roll 76 of uniform diameter and supported from a carriage (not shown) similar to that described in the prior embodiment. Beneath the top roll 76 is a bottom idle roll 77 of smaller outer diameter and adapted to carry a plurality of axially spaced cylindrical elements 78 thereon as described in the prior embodiment. The cylindrical elements 78 are mounted for free rotation and the top and bottom rolls are adapted to pass therebetween an extruded structural panel member 79 illustrated as having a section similar to that in the prior embodiment.

Between the spaced sets of rolls 75 may be suitably supported from a cross-member (not shown) such as 39 described in the prior embodiment, a vibrator element 80 adapted to reciprocate vertically at relatively high frequencies so as to produce continuous repetitious impact forces of selected magnitude upon the portion of the metal member lying between the sets of rolls 75. It is understood that in this modification the metal member 79 is stretched to a point just below the yield point of the metal so that such vibration will stress the metal slightly past the yield point thereof.

In phantom lines in Fig. 6 and below the vibrator element 80 is illustrated a bottom vibrator element 81 which may be employed if desired, together with vibrator element 80 in order to additionally work the reinforcing ribs of the metal member 79. Each vibrator element 80 and 81 may be actuated by suitable vibrator means well known in the art and operation of this embodiment is similar to that previously described.

It is understood that the bottom rolls 43 are adapted to carry cylindrical elements 55 spaced along each roll to correspond with the spacing of the integral reinforcing ribs formed on the extruded panel member 15. The radial differential between the radii of the bottom rollers 43 and the cylindrical elements 55 likewise correspond to the depth of the ribs or the spacing between faces 17 and 57. It will be readily apparent that because of the difference in radius and the corresponding difference in circumference of a bottom roll 43 and a cylindrical element 55 movement of the carriage will cause the element 55 to slip with respect to the bottom roll 43. Therefore, the freely rotatable mounting of each element 55 on a bottom roll 43 is of importance.

It should be noted that in the assembly of each bottom roll 43, spacers may be employed as desired between the cylindrical elements 55 in order to maintain a fixed spaced relationship, such relationship being normally maintained by the depending reinforcing ribs on an extruded member. However, it may be desirable in some instances to provide such spacers in order to prevent twisting forces from acting upon the cylindrical elements. It may also be noted that the cylindrical elements on the bottom roller may be of the same diameter along the length of the bottom roller if the depth of the integrally formed extruded reinforcing ribs are substantially equal. In the event the design of a wing structure requires that the depth of the reinforcing ribs be varied transversely of an extruded panel member the cylindrical elements may be varied in diameter so as to properly accommodate the variance in depth of such reinforcing ribs. In such a varied design it may be necessary to mount selected relatively small diameter cylindrical elements on the bottom roller 43 to provide bearing surfaces against bottom faces of reinforcing ribs of less depth than other reinforcing ribs.

The roll means of this invention is thus capable of accommodating structural metal sections having three or more surfaces lying in spaced approximately parallel planes so as to form one surface substantially flat and without irregularities or undulations therein while permanently straightening the metal section. The vibrator action is of sufficient magnitude to cause enough bending and change of molecular structure to straighten the panel member. It should be noted that the top roll may be applied with sufficient pressure to flex the panel member beyond the yield point if desired and the vibrator not utilized. The vibrator does harden the surfaces of the panel member, however, and such work hardening may be very desirable for certain uses.

It is understood that various modifications and changes may be made in the apparatus of this invention which come within the spirit of the invention and all such changes and modifications coming within the scope of the appended claims are embraced thereby.

I claim:

1. In an apparatus adapted to straighten an unsymmetrically arranged structural skin section extruded with integral, longitudinally extending reinforcing ribs on one side thereof, the combination of: a bed; means carried by the bed for grasping and longitudinally tensioning a skin section; a carriage guidably mounted and movable along said bed; roll means carried by the carriage including a vertically adjustable top idle transverse roll of uniform diameter adapted to contact an uninterrupted sheet-like surface of the skin section on a transverse line coextensive with the width of the skin section; a pair of spaced bottom idle transverse rolls carried by the carriage beneath said top roll and at each side thereof; each bottom roll comprising a roll element of uniform diameter adapted to contact edge faces on reinforcing ribs and a plurality of axially spaced cylindrical elements of greater diameter than the roll element freely rotatable and longitudinally slidably adjustable on said roll element, said cylindrical elements being adapted to extend between said ribs to contact faces of said skin section between said ribs; means carried by the carriage to apply pressure to the top roll for slightly flexing the skin section between the spaced bottom rolls; means for driving said carriage along said bed; and vibrator means carried by the carriage and associated with the top roll to impart vibrations to the skin section for working metal of the skin section slightly past the yield point.

2. An apparatus as described in claim 1 wherein anti-friction means rotatably mount each cylindrical element on said roll element, and said anti-friction means are slidable on said roll element.

3. In an apparatus for straightening an unsymmetrical structural metal panel member having laterally spaced integral reinforcing means on one side thereof, the combination of: means for grasping and tensioning a panel member; means progressively movable along said member for working portions of said member past the yield point of the metal of said member; said movable means including a top pressure idle roll of uniform diameter transversely coextensive with and adapted to contact a sheet-like uninterrupted surface of a panel member; a pair of spaced bottom idle rolls lying parallel to and at each side of the top roll; each bottom roll having a plurality of axially spaced longitudinally slidable, freely rotatable cylindrical elements, each having a diameter greater than said bottom roll and adapted to project between the reinforcing means for contact with faces on the panel member between said reinforcing means; said bottom roll being adapted to contact edge faces on said reinforcing means; and means for vibrating said panel member as said movable means progresses along said member.

4. In an apparatus for straightening a structural sheet-like metal panel member having a plurality of transversely spaced integral reinforcing ribs on one side thereof, the combination of: means for grasping and tensioning a panel member; means progressively movable along said panel member for working portions of said member past the yield point of the metal thereof; said movable means including a top transverse roll of uniform diameter adapted to contact a top surface of the panel member along a transverse line; and a pair of bottom idle transverse rolls, each roll including spaced cylindrical elements movable thereon and providing with said roll alternately arranged radially spaced, cylindrical surfaces of different diameter adapted to contact spaced faces on said panel member between said ribs and faces on said reinforcing ribs spaced from and parallel to the faces on said panel member, one cylindrical surface being mounted for movement relative to the adjacent cylindrical surface of different diameter.

5. An apparatus as claimed in claim 4 wherein means are carried by the movable means for applying pressure to the top roll.

6. An apparatus as claimed in claim 4 wherein means are carried by the movable means for imparting vibrations of selected magnitude to the panel member between said bottom rolls.

7. In an apparatus for straightening a structural sheet-like metal panel member having a plurality of spaced integral reinforcing ribs on one side thereof, the combination of: means for grasping and tensioning a panel member; means progressively movable along said panel member for working portions of said member past the yield point of the metal thereof; said movable means including top transverse roll means of uniform diameter adapted to coextensively contact a top plain surface of the panel member; a pair of bottom transverse composite roll means cooperatively positioned with respect to the top roll means; and each bottom roll means having a plurality of movable cylindrical elements providing therewith a plurality of radially separated cylindrical surfaces alternately arranged in axially spaced and adjustable relation adapted to contact spaced, approximately parallel faces formed on said panel member and said reinforcing ribs.

8. An apparatus as claimed in claim 7 wherein means are provided for relative movement of the outer, radially spaced cylindrical surfaces with respect to inner radially spaced, cylindrical surfaces on said bottom roll means.

9. An apparatus as defined in claim 8 wherein vibrator means are carried by said movable means for imparting vibrations to said panel member adjacent to said bottom roll means.

10. In an apparatus for straightening an integrally reinforced metal panel member comprising a sheet having a flat surface on one side and a plurality of longitudinally extending rib members projecting from the other surface of said sheet, the combination of: means for grasping and tensioning such a panel member for causing the sheet to lie in a selected zone; means for deflecting the sheet to displace the neutral axis thereof in a local transverse zone, said deflecting means comprising a roll of uniform diameter arranged to transversely contact the flat surface of said sheet, a pair of rolls spaced from and on opposite sides of said first roll and adapted to be arranged on the other side of said sheet, each roll of the pair of rolls including a plurality of axially spaced, antifrictionally mounted cylindrical elements having faces arranged to extend between said rib members for contact with the surface of the sheet opposite to said flat surface for causing deflection of said sheet and radially spaced faces arranged opposite to said rib members for contact therewith for causing simultaneous virtually corresponding deflection of the rib members, the faces on said cylindrical elements being movable relative to the radially spaced faces on the roll affording support therefor.

11. In an apparatus for straightening an integrally reinforced metal panel member including a sheet-like portion having a flat uninterrupted surface on one side and longitudinally extending parallel integral reinforcing ribs projecting from the opposite side of said sheet-like portion, the combination of: means to grasp and longitudinally tension such a panel member to position the neutral axis of said sheet-like portion in a selected plane; and a longitudinally movable roll assembly for deflecting the neutral axis of the sheet-like portion out of said plane comprising a top roll member of uniform diameter presenting a cylindrical surface to transversely contact said flat surface for the entire width thereof, and a plurality of composite roll means on the opposite side of said panel member, each including a bottom roll member of uniform diameter presenting cylindrical surfaces to contact edges of the ribs of said panel member and a plurality of longitudinally, adjustably spaced roll elements each freely rotatable on said bottom roll member and provided with circumferential surfaces to contact the under faces of said sheet-like portion between said reinforcing ribs.

12. An apparatus as claimed in claim 11, wherein means are movable with the roll assembly for imparting vibrations to the top roll member for transmission to said panel member for working the metal of said panel member past the yield point thereof.

13. An apparatus as stated in claim 11, wherein means are movable with the roll assembly to impart vibrations to said panel member adjacent said roll assembly to work the metal of said panel member past the yield point thereof.

14. A method of producing a flat surface on a metallic panel composed of a sheet having a plain uninterrupted surface on one side and having a plurality of longitudinally extending rib members integral with said sheet and projecting from the opposite surface thereof which comprises: placing the panel under tension in a direction parallel with the integral rib members and then deflecting and working uniformly substantially all of the metal of said sheet and rib members to displace the neutral axis of said sheet, from the plane thereof established by the tensioning of the panel, along a zone extending transversely of the panel, continuously advancing said zone from one end portion to the opposite end portion of said panel, and imparting selected vibrations to the metal in said transversely extending zone as the zone is advanced.

References Cited in the file of this patent

UNITED STATES PATENTS

| | | |
|---|---|---|
| 47,208 | Johnston | Apr. 11, 1865 |
| 418,229 | Roenspiess et al. | Dec. 31, 1889 |
| 598,140 | Doyle et al. | Feb. 1, 1898 |
| 1,269,631 | Mosby | June 18, 1918 |
| 1,562,916 | Rendleman | Nov. 24, 1925 |
| 1,608,910 | Sjolander | Nov. 30, 1926 |
| 1,723,098 | Ungerer | Aug. 6, 1929 |
| 1,936,228 | Crafton | Nov. 21, 1933 |
| 2,180,879 | McFadden | Nov. 21, 1939 |
| 2,642,113 | Kennedy et al. | June 16, 1953 |
| 2,692,421 | Cozzo | Oct. 26, 1954 |

FOREIGN PATENTS

| | | |
|---|---|---|
| 465,161 | Germany | Sept. 8, 1928 |
| 644,830 | Great Britain | Oct. 18, 1950 |